2,536,307

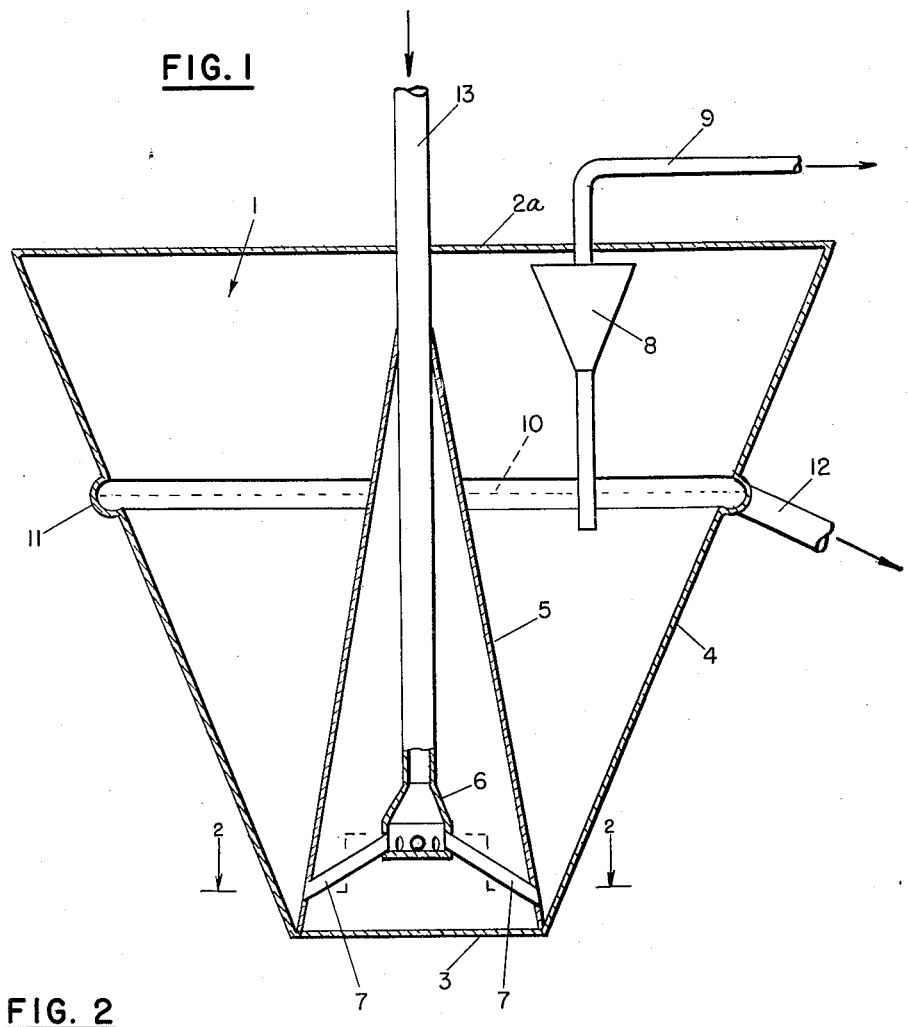
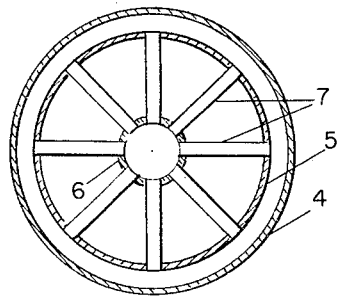
Jan. 2, 1951 — L. E. OLSON — 2,536,307
CONVERSION OF HYDROCARBONS
Filed June 11, 1947
FIG. 1
FIG. 2
INVENTOR.
LEONARD EUGENE OLSON
BY
Pennie, Edmonds, Morton & Barrows
ATTORNEYS Patented Jan. 2, 1951

UNITED STATES PATENT OFFICE 2,536,307

CONVERSION OF HYDROCARBONS

Leonard Eugene Olson, Chicago, Ill., assignor to Sinclair Refining Company, New York, N. Y., a corporation of Maine Application June 11, 1947, Serial No. 754,014

4 Claims. (Cl. 196—52)

This invention relates to conversion of hydrocarbons and more particularly to conversion processes involving the use of finely divided solid catalysts.

In the conversion of hydrocarbon base stocks to produce products having desired properties, such as high octane number for use in gasoline, the stock is submitted to one of several processes, such as cracking, hydrogenation, dehydrogenation, etc., in the presence of a catalyst.

The present invention is directed to a process in which a charge oil and a catalyst are delivered to the bottom of a reactor and travel upwardly therein and in which the transverse dimension of the reactor rapidly increases from the bottom toward the top. I thus provide a large velocity gradient measuring along the vertical axis of the reactor and thereby obtain better separation of the catalyst and the charge oil than is obtained in reactors of conventional type wherein the transverse dimension of the reactor is the same or substantially the same throughout.

One specific means of carrying out the invention which is herein illustrated is to provide a reactor in the shape of a section of an inverted cone with a centrally arranged conical inner member, the base of which is of substantially the same diameter as the base of the reactor. The charge oil and catalyst are delivered to the bottom of the reactor in such manner as to obtain uniform distribution radially of the reactor, as by delivering the mixture at a plurality of points, in any suitable manner. I may thus provide an inlet pipe entering the top of the reactor and passing downwardly through the inner cone to a point adjacent the bottom where the mixture of charge oil and catalyst is delivered to a header. A plurality of pipes or passages extend from this header into the bottom of the reactor. The mixture of charge oil and catalyst is thus delivered to the bottom of the reactor in a portion which is of minimum area and then pass upwardly in an annular chamber having inner and outer walls diverging from each other thereby providing a large velocity gradient and achieving better separation of the treated vapors and catalyst than would otherwise be obtained. The treated stock is removed from the reactor through a cyclone separator and the catalyst is removed in any suitable manner at a point adjacent the vapor-solid interface.

In the accompanying drawing I have shown, more or less diagrammatically, one form of apparatus suitable for use in practicing the process and forming a part of the invention. In this showing:

Fig. 1 is a vertical, sectional view; and

Fig. 2 is a horizontal, sectional view on line 2—2 of Fig. 1.

Referring to the drawing, the reference numeral 1 designates generally the reactor which may be formed in the shape of an inverted cone. Thus, the top 2a is of greater size than the bottom 3 and the top and bottom are connected by a wall 4 at an angle to the vertical axis. Within the reactor I provide an inner cone 5, the base of which is of substantially the same size as the bottom 3 of the reactor. As shown, the cone 5 is arranged axially of the reactor 1 and extends upwardly from the bottom to a point adjacent the top.

In carrying out the invention I propose to deliver the mixture of charge oil to be treated and catalyst to the interior of the reactor adjacent the bottom thereof. One means of accomplishing this is to provide an inlet pipe 13 extending through the top of the reactor and downwardly through the cone 5 to a point adjacent the bottom where it communicates with a header 6. A plurality of pipes 7, preferably radially arranged as shown, extend from the header 6 into the bottom of the reactor. The oil vapors rising to the top of the reactor pass through a cyclone separator 8 to remove suspended catalyst from the vapors and then through conduit 9 to suitable fractionating apparatus. The catalyst level in the reactor is indicated by the dotted line 10 and at approximately this point, the reactor is provided with a bustle pipe 11 communicating with a discharge 12 for the spent catalyst.

As an example of a conversion process, in cracking gas oil, the reaction temperature may, with advantage, be within the range of 800 to 1000° F. and the pressure at the top of the reactor within the range of about 5 to 25 pounds per square inch. The regeneration temperature may be within the range of 950 to 1200° F., heat for the reaction being supplied largely by the hot catalyst passing into the charge oil from the regenerator.

The catalyst employed may be of the type conventionally used in flu'd catalyst processes, for instance, a silica-alumina type catalyst, in finely divided, or powdered form. The mixture of charge oil and catalyst is delivered to the header 6 through pipe 13. Thence it passes into the bottom of the reactor through the branch pipes 7. As the vapors tend to move upwardly in the reactor, the catalyst tends to gravitate downwardly and settles out of the vapors. This natural tendency of the catalyst to gravitate downwardly is accentuated by the increase in area in the reactor from the bottom toward the top. This provides a velocity gradient which facilitates separation of the catalyst from the treated vapors. The vapors then pass through the cyclone separator 8 which removes any finer particles of catalyst still entrained in the vapors and flows through outlet 9 to suitable fractionators (not shown). The catalyst separated from the vapors forms a relatively dense fluidized bed at about the level 10 and as additional vapors and catalyst are fed into the bottom of the reactor, the spent catalyst is discharged through conduit 12 and conveyed by suitable means to the regenerator.

While a specific example has been given of cracking charge oil, it will be apparent that the process may be employed in connection with any fluid catalyst conversion process in which finely divided catalyst is conveyed into the reactor with the charge oil. The reaction conditions will, therefore, vary according to the particular process being performed, as understood by the art, and the optimum temperatures and pressures will depend upon the type of feed stock used, the particular catalyst employed and the reaction desired.

I claim:

1. In the conversion of hydrocarbons wherein a charge oil is submitted to conversion temperatures in the presence of a catalyst in a vertical, combined reaction and catalyst-oil separating zone of upwardly increasing cross-sectional area, the improvement which comprises delivering charge oil and catalyst to an annular reaction zone of upwardly increasing cross-sectional area at the point of minimum cross-sectional area in a manner to obtain uniform radial distribution, passing the reaction mixture upwardly in rapidly diverging directions from the point of minimum area at a decreasing velocity gradient determined by the diverging inner and outer walls of the annular zone, removing treated vapors from an upper point of the reaction zone, and removing spent catalyst from an intermediate point of the reaction zone.

2. In the conversion of hydrocarbons wherein a charge oil is submitted to conversion temperatures in the presence of a catalyst, the steps comprising introducing charge oil and catalyst to the bottom of an annular reaction zone of minimum cross-sectional area in a radial direction at a plurality of points, passing the reaction mixture upwardly in directions and at a decreasing velocity gradient determined by the diverging inner and outer walls of the annular zone, removing treated vapors from an upper point in the reaction zone, and removing spent catalyst from an intermediate point of the reaction zone.

3. Apparatus for use in the conversion of hydrocarbons wherein a charge oil is submitted to conversion temperatures in the presence of a catalyst comprising a reactor in the form of an inverted cone, a second upright cone arranged axially and internally thereof, an inlet pipe extending through the top of the reactor, thence axially of the inner cone to a point adjacent the bottom thereof and communicating with the bottom of the reactor, a concentric outlet system for spent catalyst intermediate the top and bottom of the reactor, and an outlet for the converted products at the top of the reactor.

4. Apparatus for use in the conversion of hydrocarbons wherein a charge oil is submitted to conversion temperatures in the presence of a catalyst comprising a reactor in the form of an inverted cone, a second upright cone arranged axially and internally thereof, an inlet pipe extending through the top of the reactor, thence axially of the inner cone to a point adjacent the bottom thereof, a header with which the inlet pipe communicates, branches extending from the header through the inner cone to the bottom of the reactor, and an outlet pipe at the top of the reactor.

LEONARD EUGENE OLSON.

REFERENCES CITED

The following references are of record in the file of this patent:

UNITED STATES PATENTS

| Number | Name | Date |
|---|---|---|
| 2,031,591 | Daugherty, Jr. | Feb. 25, 1936 |
| 2,369,523 | Belchetz | Feb. 13, 1945 |
| 2,379,711 | Hemminger | July 3, 1945 |
| 2,425,372 | Green | Aug. 12, 1947 |
| 2,464,617 | Sebald | Mar. 15, 1949 |

OTHER REFERENCES

Hurd: "The Pyrolysis of Carbon Compounds," 1929, pages 9 and 10. The Chemical Catalog Company, Inc.